United States Patent [19]

Stumpp et al.

[11] 4,286,615
[45] Sep. 1, 1981

[54] APPARATUS FOR MEASURING THE AMOUNT OF FLUID SUPPLIED BY A FLUID SUPPLY DEVICE

[75] Inventors: Gerhard Stumpp, Stuttgart; Wolf Wessel, Oberriexingen, both of Fed. Rep. of Germany

[73] Assignee: Robert Bosch GmbH, Stuttgart, Fed. Rep. of Germany

[21] Appl. No.: 19,521

[22] Filed: Mar. 12, 1979

[30] Foreign Application Priority Data

Mar. 21, 1978 [DE] Fed. Rep. of Germany ....... 2812233

[51] Int. Cl.³ .......................................... G05D 11/03
[52] U.S. Cl. ................................. 137/117; 137/487; 137/489.5; 137/554; 137/556; 137/557
[58] Field of Search ...................... 137/487, 489.5, 117, 137/554, 556, 557

[56] References Cited

U.S. PATENT DOCUMENTS

| | | | |
|---|---|---|---|
| 1,487,402 | 3/1924 | Roucka | 137/487 |
| 2,111,837 | 3/1938 | Brisbane | 137/487 |
| 2,523,826 | 9/1950 | Heinzelman | 137/487 |
| 2,703,961 | 3/1955 | Harding | 137/487 |
| 3,055,389 | 9/1962 | Brunner | 137/487 |
| 3,290,998 | 12/1966 | Clements et al. | 137/554 |
| 3,589,384 | 6/1971 | Eckert | 137/487 |

*Primary Examiner*—Martin P. Schwadron
*Assistant Examiner*—H. Jay Spiegel
*Attorney, Agent, or Firm*—Edwin E. Greigg

[57] ABSTRACT

Apparatus for measuring the amount of fuel supplied by a fluid supply device wherein a throttle element is inserted in a supply line to a supply device having an apportioning cross-section wherein a constant pressure differential is maintained by means of a pressure comparison device in which the comparison results in an adjustment of the throttle element and whereby the cross-section or the position of the throttle element provides a measurement of the amount of fluid flowing through the supply line which can be transformed into a desirable and useful control value.

1 Claim, 2 Drawing Figures

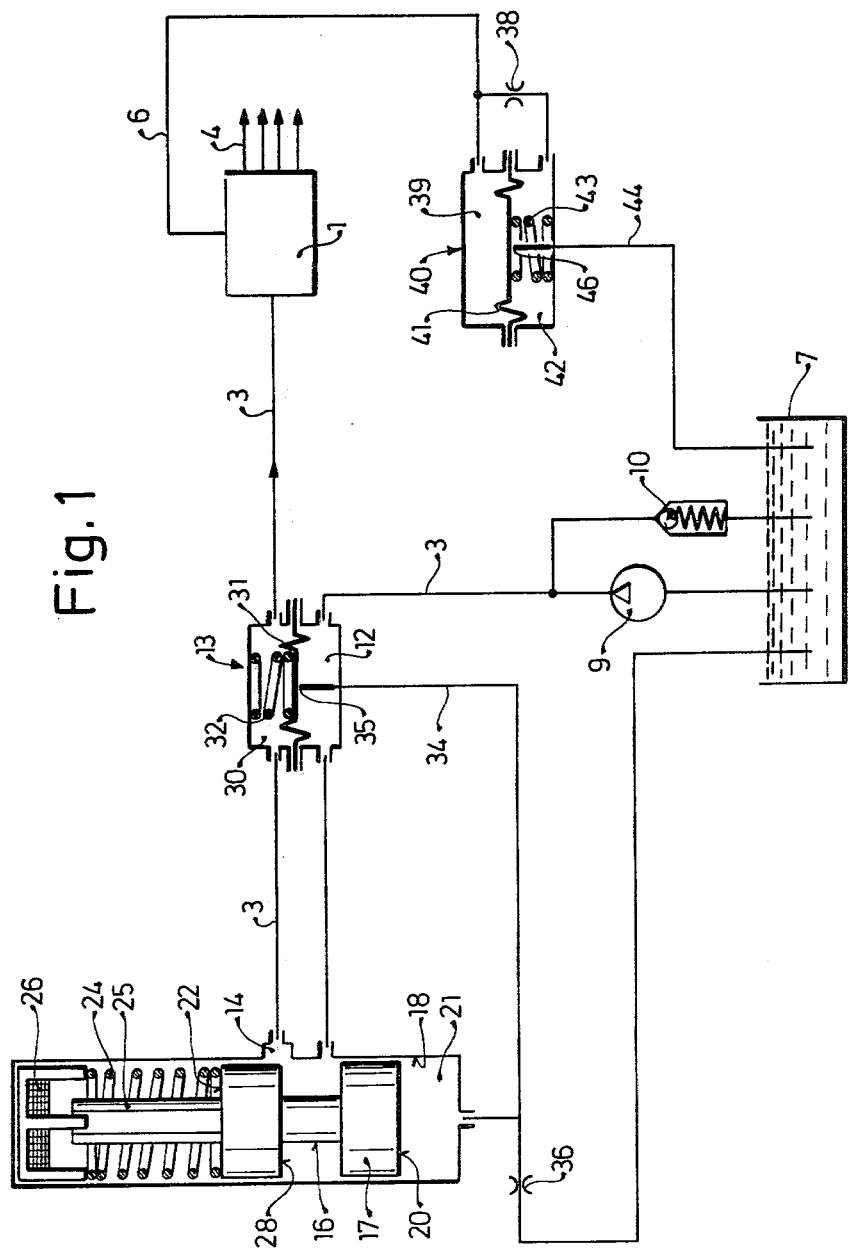

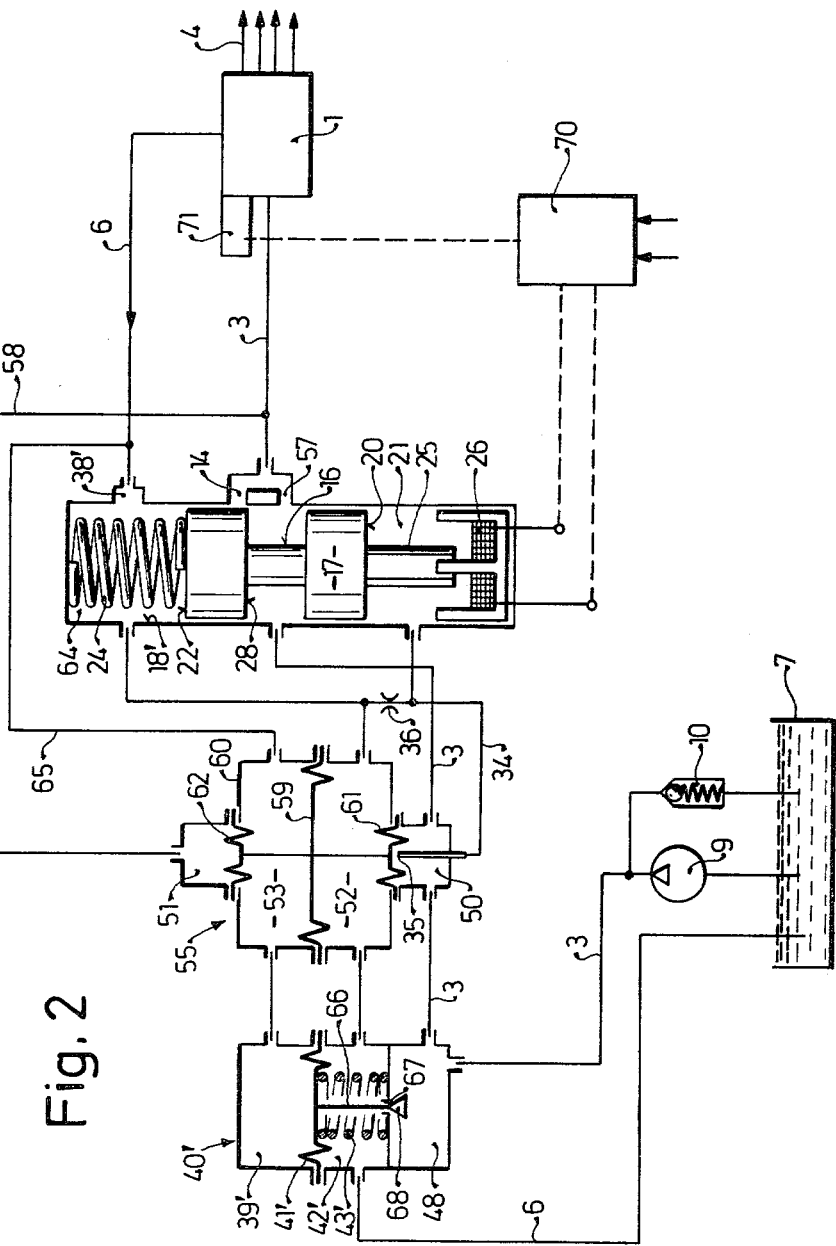

APPARATUS FOR MEASURING THE AMOUNT OF FLUID SUPPLIED BY A FLUID SUPPLY DEVICE

BACKGROUND OF THE INVENTION

It is well known to provide an apportioning device for fuel which is operated according to the amount of fresh air provided through the suction pipe of an internal combustion engine in connection with a measuring device for the amount of apportioned fuel. A throttle element in the supply line to the fuel supply mechanism is activated by an air volume meter, and by means of a differential pressure valve, the pressure differential on the cross-section released by the throttle element is maintained constant. The cross-section controlled by the throttle element in the fuel supply line is of slit-like shape so that the position of the throttle element is proportional to the flowing amount of fuel. The position of the throttle element is converted into a voltage corresponding to the flow by an inductance transducer. The fuel is advanced by the difference of pressure between the supply pressure and the pressure existing inside the suction pipe at the fuel outlet. This device can only be realized in connection with the corresponding apportioning device, and it is therefore applicable only in a limited manner to the measuring of fluids.

OBJECT AND SUMMARY OF THE INVENTION

An object of the invention is to provide a measuring device which is universally applicable and is utilized for measuring an amount of liquid per unit of time, as well as for the generation of a control value which can be used in a regulation device. The device functions in a precise manner since with a slit-like shape for the apportioning cross-section, a linear relationship between the adjustment of the throttle element and the flow can be achieved in a simple manner.

The invention is especially advantageous in the fact that with a fluid supply device wherein a part of the amount of fluid provided is returned through a return flow line to the fluid tank, a constant flow cross-section is accomplished in the return flow line by means of a differential pressure valve for generating a constant pressure differential at the flow cross-section. With injection pumps, a so-called "flush amount" is necessary for the cooling of the injection pump. However, this "flush amount" would distort the resulting measurement if only the actual fuel amount from the fuel injection pump to the injection valves of the internal combustion engine were considered. With the arrangement according to the invention, the flush amount is kept constant, so that with adequate calibration, a value can be obtained which corresponds exactly to the amount of fuel delivered.

The invention will be better understood as well as further objects and advantages thereof become more apparent from the ensuing detailed description of exemplary embodiments taken in conjunction with the drawings.

BRIEF DESCRIPTION OF THE DRAWINGS

FIG. 1 is a schematic diagram of the invention showing a differential pressure valve arranged in parallel with an apportioning cross-section to serve as a pressure comparison device together with a differential pressure valve to maintain a flush amount flowing from a fuel injection pump constant; and FIG. 2 is a schematic diagram of a supplementary device for the arrangement according to FIG. 1 with a pressure comparison device that utilizes the differential pressure of the constant pressure contrast at the apportioning cross-section which determines the flush amount as a nominal value.

DESCRIPTION OF THE PREFERRED EMBODIMENTS

FIG. 1 shows the device of the invention for measuring the amount of fuel apportioned to an injection pump. In FIG. 1, the injection pump 1 is supplied with fuel through a fuel supply line 3 and pumps the essential portion of the amount of fuel which has been delivered to the pump on to the injection valves of an internal combustion engine (not shown in further detail). A return flow line 6, which returns part of the supplied fuel to the fuel tank 7, is connected to the injection pump 1.

In order to deliver the fuel from the fuel tank 7 through the supply line 3 to the injection pump 1, a pre-delivery pump 9 is provided connected in parallel with a pressure regulation valve 10 so that the fuel in the supply line 3, under constant pressure, can flow into an apportioning cross-section 14 through a first pressure chamber 12 of a second differential pressure valve 13. The supply line 3 opens, without interruption, into an annular chamber which is formed by an annular groove 16 and the wall of a closed cylinder 18, with the annular groove 15 located at the face of a working piston 17, movable inside the closed cylinder 18.

One front face 20 of the working piston 17 encloses a working chamber 21 together with the closed end of the cylinder 18, while on the other front face 22 of the working piston 17, a pressure spring 24 is located within the cylinder 18.

A displacement transducer element 25 is connected with the piston front face 22 and cooperates with a displacement-voltage converter 26. This displacement-voltage converter 26 may be, for example, an inductance transducer for a short-circuit annular transducer.

In the wall of the closed cylinder 18, there is provided a slit-like opening serving as the apportioning cross-section 14 which is controlled by the limiting edge 28 of the annular groove 16 dependent on the position of the working piston 17, which serves at the same time as the throttle element, being more or less open. The second differential pressure valve 13 has a second pressure chamber 30 which is separated from the first pressure chamber 12 by a membrane 31 and in which a pressure spring 32 is inserted which presses against the membrane 31.

A return flow line 34 projects into the first pressure chamber 12 and its outlet opening 35 is controlled by the membrane 31 being opened more or less according to the position of the membrane 31. In the return flow line 34, which leads to the fuel tank 7, a return throttle 36 is provided and upstream of the throttle 36, line 34 is connected to the working chamber 21. The supply line 3 is connected to the second working chamber 30 and to the apportioning cross-section 14. From chamber 30, the supply line 3 is connected to the injection pump 1.

With the device of the invention, the amount of fuel supplied to an injection pump 1 can be measured very precisely if the fuel injection pump can function without a so-called flush amount or if the flush amount, if any, is returned directly through a heat exchanger to the fuel injection pump 1. In this case, the amount of fuel flowing in the supply line 3 corresponds to the amount of fuel injected. The device operates as follows:

The pressure contrast appearing at the apportioning cross-section 14 is determined by the pressure spring 31 in the second pressure chamber 30 of the differential pressure valve 13. If more fuel is taken by the injection pump 1 than can flow through the slot 14 with this pressure contrast, the pressure in the pressure chamber 30 decreases. Correspondingly, the membrane 31 moves away from the return line opening 35 so that more fuel can flow through the return line 34. At the throttle 36, a higher pressure is generated which is transmitted to the working chamber 21 and which moves the piston 17 against the force of the pressure spring 24 until equilibrium of the piston is reached. The displacement transducer element 25 is moved accordingly and the apportioning cross-section 14 is enlarged. The differential pressure valve 13 is adjusted again to equilibrium by the amount of fuel which flows increasingly to the second pressure chamber 30. By decreasing the amount of fuel delivered to the injection pump 1, the above operation is reversed. With this arrangement, the pressure contrast at the apportioning cross-section 14 is maintained constant in order that the position of the piston 17 is linear with respect to the amount of fuel which is injected per unit of time by the fuel injection pump. The device of the invention has the advantage that the changes in the amount of fuel are picked up almost without any inertia and therefore a rapid regulation is possible with little idle time, since the entire working pressure of pre-delivery pump 9 is directly available for the displacement of the piston 17.

If, however, a fuel flush amount for cooling of the fuel injection pump 1 should be removed and returned to the fuel tank 7, this amount distorts the measurement results of the device described above. The return of the fuel flush amount to the fuel tank 7 has the advantage provided by a fuel-cooling apparatus and any possible vapor bubbles are condensed there. Thus an additional cooler is not necessary. In order, nevertheless, to arrive at an exact measurement value, a constant flowthrough cross-section 38 is provided in the return line 6 through which the fuel flush amount flows, and the return line 6 is connected upstream of the flowthrough cross-section 38 with a first pressure chamber 39 of a differential pressure valve 40.

The first pressure chamber 39 is separated by a membrane 31 from a second pressure chamber 42, in which is located a pressure spring 43 pressing on the membrane 41 and into which the return flow line 6 connects downstream of the flowthrough cross-section 38. The return flow line 6 leaves the second pressure chamber 42 through relief line 44 and connects with the fuel tank 7.

In the second pressure chamber 42, relief line 44 has an outlet cross-section 46 which is controllable by the membrane 41 and which can be closed or opened completely depending on the position of the membrane 41. By means of a differential pressure valve, a constant pressure contrast is produced in a known manner at the flowthrough cross-section 38 by means of the initial tension of the pressure spring 43 and by controlling the returning amount of fuel downstream of the flowthrough cross-section 38.

With this arrangement, the fuel flush amount per unit of time is maintained at a constant value. If at the flowthrough cross-section 38, a pressure contrast is maintained which is equal to the pressure contrast at the apportioning cross-section 14, the device can be calibrated in such a way that the measuring process begins with a certain opening cross-section of the apportioning cross-section 14. This basic opening cross-section should then be as wide as the flowthrough cross-section 38 when these cross-sections have the same physical properties. In this manner, one can arrive at an exact measurement value of the actual injection amount per unit of time delivered by the fuel injection pump 1. With this hydraulic operation of the device, error-producing frictional resistances are avoided.

Referring now to FIG. 2, there is shown schematically another embodiment of the invention. As in the embodiment of FIG. 1, FIG. 2 also shows an injection pump 1 with injection lines 4 and the return line 6 for the fuel flush amount. The fuel injection pump 1 is supplied with fuel through the supply line 3 through which the pre-delivery pump 9 pumps fuel from the fuel tank 7 under a pressure which can be regulated by the pressure regulation valve 10.

A third pressure chamber 48 of a differential pressure valve 40 and a first external pressure chamber 50 of a three-membrane valve 55 are inserted in the supply line 3 in the direction of fuel flow.

Downstream, the supply line 3 leads directly into the annular groove 16 on the working piston 17 which serves as the throttle element and which also, as in the embodiment of FIG. 1, can be moved in a closed cylinder 18 against the force of a pressure spring 24. The one front face 20 limits the working chamber 21 which, as in the embodiment of FIG. 1, connects with the fuel return line 34 upstream of the return throttle 36 and which is provided with a variable working pressure. The pressure spring 24 is disposed in the closed cylinder 18' and engages the opposite front face 22 of the working piston 17. In the wall of the closed cylinder 18', two slit-like outlet cross-sections are provided. These cross-sections include, first, the apportioning cross-section 14, the size of whose opening is determined by the position of the piston 17 and the limitation edge 28 of the annular groove 28, and a second flow cross-section 57 which is continuously connected with the annular chamber formed by the annular groove 16 and the wall of the cylinder 18'. The lines which lead off from the apportioning cross-section 14 and from the flowthrough cross-section 57 are connected again with the supply line 3 which is connected directly to the injection pump 1.

Downstream of this junction, a connection line 58 deviates from the supply line 3 and ends in a second external pressure chamber 51 of the three-membrane valve 55. Valve 55 encloses in its housing a central membrane 59 which separates a first internal pressure chamber 52 from a second internal pressure chamber 53. The first internal pressure chamber 52 is limited on the other side in part by the housing 60 of the three-membrane valve 55 and in part by a first external membrane 61 which has half the effective surface area of the central membrane 59. The second internal pressure chamber 53 on the other side of the central membrane 59 is also limited by the housing 60 and a second external membrane 62. The second external membrane 62 is as large as the first external membrane 61 and limits the second external pressure chamber 51. The first external membrane 61, on the other hand, encloses the first external pressure chamber 50 in the housing 60 and at the same time serves as the valve closing element for the outlet opening 35 of the return line 34 which leads off from the first external pressure chamber 50. The three membranes 59, 61, 62 themselves are solidly connected to each other.

The return line 6 branching off from the injection pump 1 connects with chamber 64 enclosed by the other front face 22 in the closed cylinder 18' through a constant, always-open, slit-like flow cross-section 38'. From there, the line 6 leads off unthrottled to the first internal pressure chamber 52 and from there in turn directly to the second pressure chamber 42' of the differential pressure valve 40'. From this pressure chamber 42', the return line 6 leads directly back to the fuel tank 7.

Upstream of the flowthrough cross-section 38', a connection line 65 branches off and connects with the second internal pressure chamber 53 of the three-membrane valve 55. This second pressure chamber 53 is also connected with the first pressure chamber 39' of the differential pressure valve 40'.

The differential pressure valve 40' also contains the membrane 41' which separates the first pressure chamber 39' from the second pressure chamber 42' in which a pressure spring 43' is disposed which engages the membrane 41'. As contrasted with the differential pressure valve 40 of the embodiment of FIG. 1, the differential pressure valve 40' contains a throttle element 66 which is connected with the membrane 41' and the throttle element 66 projects through an opening 67 and closes it with the conical end 68 when the membrane 41' is moved in the effective direction of the spring 43'. Through the opening 67, the second pressure chamber 42' can be connected with the third pressure chamber 48.

The operation of the device of FIG. 2 is as follows:

Through the differential pressure valve 40', a constant pressure contrast is set up at the flowthrough cross-section 38' in the return line 6. With this arrangement, the pressure present in the first pressure chamber 39', which equals the pressure upstream of the flowthrough cross-section 38', is compared with the pressure present in the second pressure chamber 42', which equals the pressure downstream of the flowthrough cross-section 38', whereby the pressure contrast is determined by the design of the pressure spring 43'. If the pressure in pressure chamber 39' increases, the membrane 41' is lifted up against the pressure of the spring 43' in such a way that the opening 67 is open and small amounts of the fuel, which is under the higher system pressure, can flow from the third pressure chamber into the second pressure chamber 42'. This continues until the desired pressure contrast is again obtained. In the reverse case, the opening 67 is closed completely until the desired pressure contrast is achieved again by an increase of the pressure upstream of the flowthrough cross-section 38'. In this manner, a constant desired amount of flush fuel always flows through the return line 6.

The constantly controlled differential pressure is used both as a nominal value and as a reference pressure for the three-membrane valve 55 which serves as a pressure comparison device. In this way, a constant force is maintained which is exerted on the membrane combination and which tends to pull the first external membrane 61 in the direction of the outlet opening 35. Acting counter thereto is the differential pressure which is to be regulated to a constant value at the apportioning cross-section 14. In addition, the higher system pressure upstream of the apportioning cross-section 14 in the first external pressure chamber 50 is effective on the first external membrane 61 and, in a reverse direction, the lower fuel pressure downstream of the apportioning cross-section 14 is effective on the second external membrane 62. As a result of the arrangement of the surfaces of the membranes, the pressure contrast at the flowthrough cross-section 38' is equal to the pressure contrast at the apportioning cross-section 14 when there is an equilibrium of the membrane combination.

If, when there is an equilibrium of the membrane combination, the amount of fuel supplied by the fuel injection pump is increased, then the pressure downstream of the apportioning cross-section 14 and the pressure in the second external pressure chamber 51 drops. As a result, the membrane combination is moved upward and the outlet opening 35 is enlarged. As a result of the increased outflow amount of fuel, a higher pressure builds up at the outlet throttle 36 which, having its effect in the working chamber 21, now moves the working piston 17 against the return force acting upon it and enlarges the apportioning cross-section 14. Accordingly, the fuel pressure downstream of the apportioning cross-section 14 again increases and, for its part, changes the membrane combination in such a way that the outlet opening 35 is again throttled to an increased extent. The reverse process occurs when less fuel is delivered by the injection pump.

The working piston 17 is therefore always adjusted when the pressure contrast at the apportioning cross-section 14 deviates from the pressure contrast at the flowthrough cross-section 38' which is the nominal value. With a constant pressure contrast and a slitlike apportioning cross-section 14, the position of the working piston 17 corresponds to the amount of fuel which flows to the injection pump 1. This position is intercepted as in the embodiment of FIG. 1 by a displacement-voltage converter 26 and changed into an electrical value. As a return force, the spring 24 acts upon the working piston 17 and must be of a very soft nature in order to maintain linearity.

For measuring accuracy, the second flowthrough cross-section 57 is provided, which cannot be closed by the limitation edge 28 of the annular groove 16. This cross-section 57 has the same geometry and the same flowthrough surface area as the flowthrough cross-section 38' so that with the same pressure contrast, an equal amount of fuel flows to the injection pump 1. In this manner, the position of the working piston 17 depends only on the amount of fuel which actually is delivered by the injection pump 1 through the injection lines 4 to the internal combustion engine. The zero position of the working piston 17 is set when the apportioning cross-section 14 is closed completely by the limitation edge 28. Since the two cross-sections 38' and 57 are of equal size and have the same properties, it is assured that a minimum of errors in measuring the actual amount of fuel supplied by the injection pump 1 will occur because of the flush amount which is thereby controlled precisely at a constant value. The apportioning cross-section 14 and the flowthrough cross-section 57 can be installed in an equivalent manner at the entrance of the supply line 3 into the annular chamber 16. Similarly, the location of the flowthrough cross-section 38' can also be changed.

The electrical value received from the displacement-voltage converter 26 is used as a control value for an indicator, an alarm device or a regulator device. It can serve as a control value, for example, in an amount limitation device 70 which controls an adjusting element 71 on the injection pump 1 after comparison with a nominal value shown in broken lines in the drawings.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A device for detecting and measuring the amount of fluid delivered by a fluid delivery device having a supply line for the fluid under pressure to the delivery device having an apportioning cross-section valve characterized by the fact that a piston means is integrated in the supply line, a pressure comparison valve responsive to spring means for providing a nominal value and for comparing the pressure contrast which appears at said apportioning cross-section valve with said nominal value in said pressure comparison valve and an adjustment device for providing a correcting regulation of said piston means, said adjustment device being activated in accordance with the deviation of said pressure contrast from said nominal value and wherein the position of said piston means provides a measure of the amount of flowing fluid per unit of time, a fluid tank, a return flow line connected to said fluid tank wherein a part of the apportioned amount of fluid is returned through said return line to the fluid tank characterized by the fact that in said return line a constant flowthrough cross-section orifice is provided and a differential pressure valve operatively associated with said flowthrough cross-section orifice for the generation of a constant pressure contrast at said flowthrough cross-section orifice, a relief line having a flowthrough cross-section means characterized by the fact that said differential pressure valve controls an outlet cross-section valve following said flowthrough cross-section means in said relief line, and a displacement-voltage converter connected to said piston means for generating an electrical control value signal directly proportional to the displacement of said piston means.

* * * * *